United States Patent
Sakata (10) Patent No.: US 9,197,348 B2
(45) Date of Patent: Nov. 24, 2015

(54) OPTICAL TRANSMISSION DEVICE AND OPTICAL TRANSMISSION METHOD

(71) Applicant: FUJITSU LIMITED, Kawasaki-shi, Kanagawa (JP)

(72) Inventor: Tomoyuki Sakata, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 13/680,514

(22) Filed: Nov. 19, 2012

(65) Prior Publication Data

US 2013/0188955 A1 Jul. 25, 2013

(30) Foreign Application Priority Data

Jan. 23, 2012 (JP) .................................. 2012-011249

(51) Int. Cl.
*H04J 14/02* (2006.01)
(52) U.S. Cl.
CPC ......... *H04J 14/0221* (2013.01); *H04J 14/0283* (2013.01)
(58) Field of Classification Search
CPC ... H04J 14/02; H04J 14/0221; H04J 14/0227; H04B 10/2942; H04B 10/2931
USPC ............ 398/79, 68, 95, 97, 94, 158, 160, 192
See application file for complete search history.

(56) References Cited

U.S. PATENT DOCUMENTS

| | | | |
|---|---|---|---|
| 5,463,487 A * | 10/1995 | Epworth | 398/79 |
| 5,654,812 A * | 8/1997 | Suzuki | 398/98 |
| 5,801,860 A | 9/1998 | Yoneyama | |
| 6,804,464 B2 * | 10/2004 | Yang | 398/94 |
| 6,885,499 B1 | 4/2005 | Hoshida et al. | |
| 6,925,259 B2 * | 8/2005 | Boroditsky et al. | 398/75 |
| 7,536,110 B2 * | 5/2009 | Uda et al. | 398/177 |
| 7,899,331 B2 * | 3/2011 | Itoh et al. | 398/97 |
| 2002/0126372 A1 * | 9/2002 | Shimomura et al. | 359/341.1 |
| 2004/0091263 A1 * | 5/2004 | Sakamoto | 398/45 |
| 2005/0213969 A1 * | 9/2005 | Hakomori | 398/33 |
| 2008/0205889 A1 | 8/2008 | Aoki | |
| 2010/0239263 A1 * | 9/2010 | Tokura et al. | 398/94 |
| 2012/0148239 A1 * | 6/2012 | Mori et al. | 398/45 |
| 2013/0336651 A1 * | 12/2013 | Bato et al. | 398/38 |
| 2014/0355978 A1 * | 12/2014 | Sakata et al. | 398/25 |

FOREIGN PATENT DOCUMENTS

| | | |
|---|---|---|
| EP | 0 845 882 A2 | 6/1998 |
| JP | 09-051323 | 2/1997 |
| JP | 10-163960 | 6/1998 |
| JP | 2001-053686 | 2/2001 |
| JP | 2008-219166 | 9/2008 |
| JP | 2010-081398 | 4/2010 |

OTHER PUBLICATIONS

Japanese Office Action dated Aug. 4, 2015 in corresponding Japanese Patent Application No. 2012-011249, 7 pages.

* cited by examiner

*Primary Examiner* — Hibert Woldekidan
(74) *Attorney, Agent, or Firm* — Staas & Halsey LLP (57) ABSTRACT

There is provided an optical transmission device including: a packet disassembler configured to disassemble a packet into a plurality of signals having a different wavelength; an amplifier configured to amplify, for each of the wavelength, each signal into which the packet is disassembled by the packet disassembler, based on a correction value set for each wavelength; and a multiplexer configured to multiplex the respective signals amplified by the amplifier so as to transmit a packet generated by multiplexing the respective signals.

3 Claims, 5 Drawing Sheets

FIG. 2

| ROUTE NUMBER | λ1 | | | | | λ2 | | | | | λ3 | | | | | λ4 | | | | |
|---|---|---|---|---|---|---|---|---|---|---|---|---|---|---|---|---|---|---|---|---|
| 02 | 310 mA | | | | | 330 mA | | | | | 350 mA | | | | | 370 mA | | | | |
|  | 33 | 31 | 30 | 6D | 41 | 33 | 33 | 30 | 6D | 41 | 33 | 35 | 30 | 6D | 41 | 33 | 37 | 30 | 6D | 41 |
| 03 | 340 mA | | | | | 360 mA | | | | | 380 mA | | | | | 400 mA | | | | |
|  | 33 | 34 | 30 | 6D | 41 | 33 | 36 | 30 | 6D | 41 | 33 | 38 | 30 | 6D | 41 | 34 | 30 | 30 | 6D | 41 |
| 04 | 300 mA | | | | | 330 mA | | | | | 360 mA | | | | | 390 mA | | | | |
|  | 33 | 30 | 30 | 6D | 41 | 33 | 33 | 30 | 6D | 41 | 33 | 36 | 30 | 6D | 41 | 33 | 39 | 30 | 6D | 41 |
| 05 | 290 mA | | | | | 360 mA | | | | | 380 mA | | | | | 400 mA | | | | |
|  | 32 | 39 | 30 | 6D | 41 | 33 | 36 | 30 | 6D | 41 | 33 | 38 | 30 | 6D | 41 | 34 | 30 | 30 | 6D | 41 |
| 06 | 325 mA | | | | | 334 mA | | | | | 349 mA | | | | | 361 mA | | | | |
|  | 33 | 32 | 35 | 6D | 41 | 33 | 33 | 34 | 6D | 41 | 33 | 34 | 39 | 6D | 41 | 34 | 36 | 31 | 6D | 41 |
| 00 | null | | | | | null | | | | | null | | | | | null | | | | |
|  | 00 | 00 | 00 | 00 | 00 | 00 | 00 | 00 | 00 | 00 | 00 | 00 | 00 | 00 | 00 | 00 | 00 | 00 | 00 | 00 |
| 00 | 00 | 00 | 00 | 00 | 00 | 00 | 00 | 00 | 00 | 00 | 00 | 00 | 00 | 00 | 00 | 00 | 00 | 00 | 00 | 00 |

OPTICAL TRANSMISSION DEVICE AND OPTICAL TRANSMISSION METHOD

CROSS-REFERENCE TO RELATED APPLICATION

This application is based upon and claims the benefit of priority of the prior Japanese Patent Application No. 2012-011249, filed on Jan. 23, 2012, the entire contents of which are incorporated herein by reference.

FIELD

The embodiment discussed herein is related to an optical transmission device and an optical transmission method.

BACKGROUND

In optical signal transmission techniques in the past, there has been a WDM (wavelength division multiplex) procedure as a communication procedure of multiplexing a plurality of optical signals having different wavelengths into an optical fiber cable. In the WDM procedure, an optical transmission device can send the optical signals to a sending destination different for each wavelength. In a case of carrying out amplification of an optical output level, the optical transmission device that relays the optical signals sometimes have different numbers of relays or transmission distances depending on the routes of the optical signals. In this case, variations (hereinafter, referred to as "a tilt") in the optical output level turn out to occur between the wavelengths. As a result, a tilt sometimes does not fall within a receivable range of the output levels of optical signals (dynamic range) in an optical transmission device on the receiving side. With that, in order to reduce the tilt, the optical transmission device monitors the output level for each wavelength when relaying an optical signal and feeds back the results to the signal control to provide for equalization of the optical output levels (see Japanese Laid-open Patent Publications No. 2010-81398, No. 10-163960, and No. 9-51323).

SUMMARY

According to an aspect of the invention, an optical transmission device includes: a packet disassembler configured to disassemble a packet into a plurality of signals having a different wavelength; an amplifier configured to amplify, for each of the wavelength, each signal into which the packet is disassembled by the packet disassembler, based on a correction value set for each wavelength; and a multiplexer configured to multiplex the respective signals amplified by the amplifier so as to transmit a packet generated by multiplexing the respective signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In order to provide for equalization of the optical output levels, control to feed back a monitoring result at the output level for each wavelength for the signal control is effective in communication to send an optical signal to a sending destination different for each wavelength. In optical burst transmission to send an identical packet at different wavelengths, in order to output an optical signal continuously for a certain period of time, the optical transmission device then corrects the optical output level different for each wavelength all the time using a VOA (variable optical attenuator) or the like. However, the optical transmission device outputs (emits light of) an optical signal only when transmitting a packet for the optical burst transmission, so that the control by the VOA or the like is done after the packet transmission, and it is very difficult to reflect the feedback result in the tilt correction. Accordingly, the feedback control described above is not effective in the optical burst transmission, and a tilt in the packet turns out to increase. In such a manner, an optical signal at a wavelength not receivable as the optical output level outside the dynamic range is generated on the receiving side. In particular, since the optical burst transmission is a procedure to send one packet using a plurality of optical wavelengths, even lack of only one wavelength causes packet loss.

A detailed description is given below to an embodiment of an optical transmission device and an optical transmission method disclosed herein with reference to the drawings. It is noted that the embodiment below does not limit the optical transmission device and the optical transmission method disclosed herein.

Figure 1:
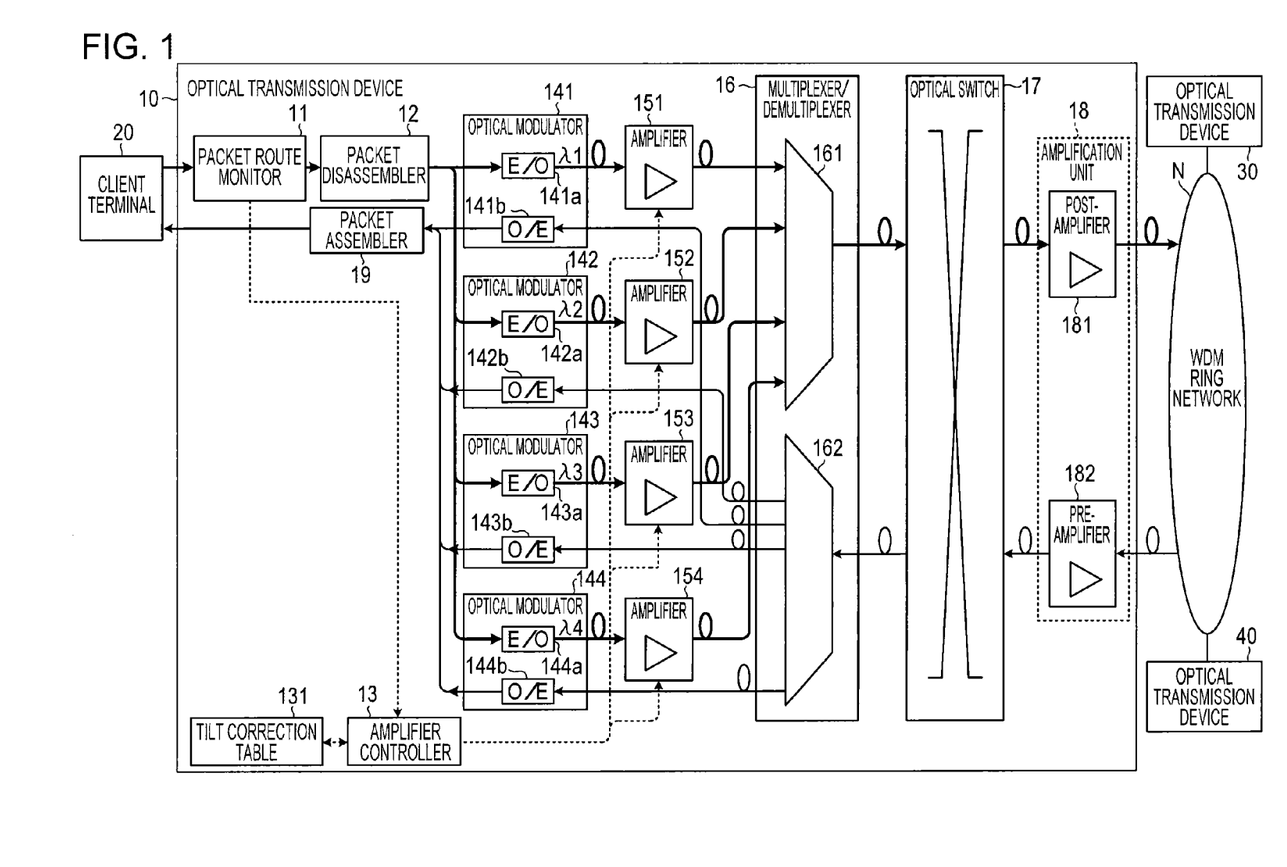
FIG. 1 is a diagram illustrating an example of a configuration of an optical transmission device.

Firstly, a configuration of an optical transmission device according to an embodiment disclosed herein is described. FIG. 1 is a diagram illustrating an example of a configuration of an optical transmission device 10 according to the present embodiment. As illustrated in FIG. 1, in a system that carries out optical transmission in the WDM procedure in the present embodiment (hereinafter, referred to as "a WDM system"), the optical transmission device 10 receives an electrical signal from a client terminal 20 and also sends an optical signal to other optical transmission devices 30 and 40 via a WDM ring network N. As receiving optical signals sent from the optical transmission devices 30 and 40 connected to the WDM ring network N, the optical transmission device 10 converts the optical signals into an electrical signal and sends it to the client terminal 20.

As illustrated in FIG. 1, the optical transmission device 10 has a packet route monitor 11, a packet disassembler 12, an amplifier controller 13, optical modulators 141 through 144, amplifiers 151 through 154, a multiplexer/demultiplexer 16, an optical switch 17, an amplification unit 18, and a packet assembler 19. These respective components are connected so as to be capable of inputting and outputting a signal and data unidirectionally or bidirectionally.

The packet route monitor 11 obtains a route number of a destination of a packet, inputted from the client terminal 20, from a header of the packet and outputs it to the amplifier controller 13. The packet disassembler 12 disassembles the packet inputted from the packet route monitor 11 into a plurality of signals and outputs the respective signals to the optical modulators 141 through 144 for a later stage. The packet route monitor 11 and the packet disassembler 12 are achieved by, for example, a CPU (central processing unit) and a FIFO (first-in first-out) buffer.

The amplifier controller 13 compares and checks a route number of the received packet against route numbers stored in a tilt correction table 131 described later. The amplifier controller 13 reads out an amplifier exciting LD (laser diode) current value for each wavelength corresponding to the above route number of the tilt correction table 131 and determines an optical output level for each of the amplifiers 151 through 154 using the current value. The amplifier controller 13 is achieved by, for example, a DSP (digital signal processor). The tilt correction table 131 is achieved by, for example, a memory, such as a RAM, like an SDRAM (synchronous dynamic random access memory), a ROM (read only memory), and a flash memory.

Figure 2:
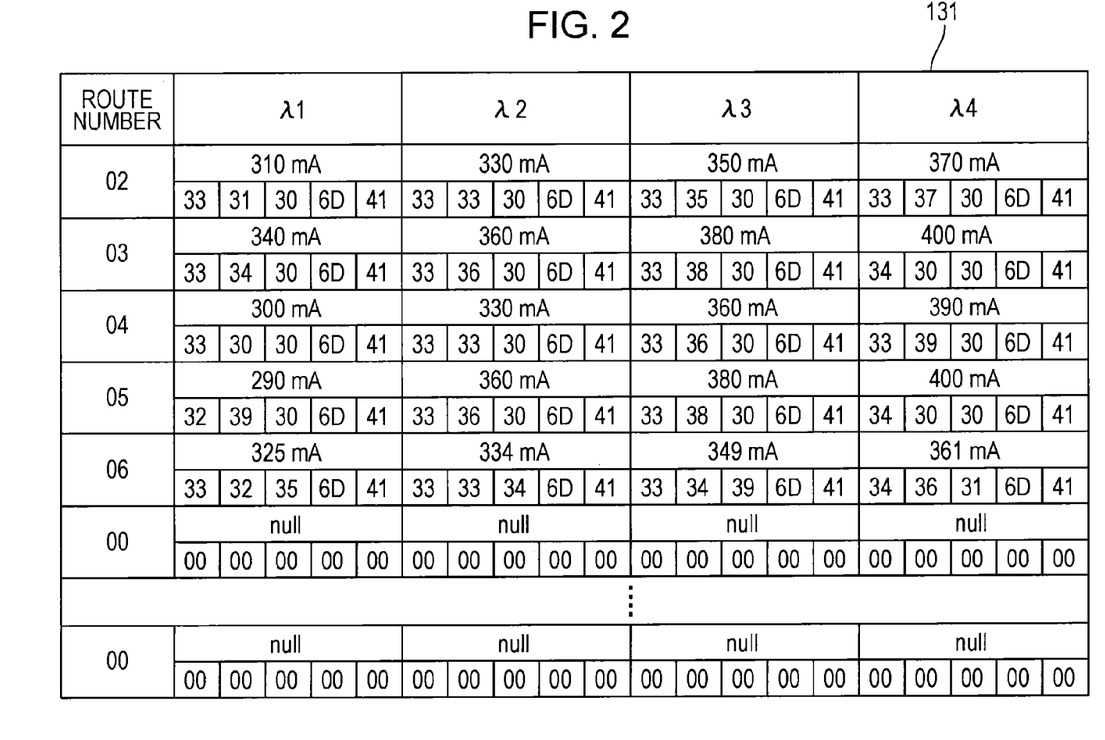
FIG. 2 is a chart illustrating an example of a tilt correction table to be referred to when determining an optical output level of each amplifier.

FIG. 2 is a chart illustrating an example of a tilt correction table 131 to be referred to when determining an optical output level of each amplifier. In the tilt correction table 131, a current value of an exciting LD for tilt amount correction (inverse tilt amount) that represents wavelength dependence in the WDM ring network N measured in advance when configuring the WDM system is stored as "an offset amount". As illustrated in FIG. 2, in the tilt correction table 131, "00" through "06" are set as the route numbers and also an exciting LD current value for the respectively corresponding amplifiers 151 through 154 is stored for each of wavelengths $\lambda_1$ through $\lambda_4$ corresponding to the respective routes. It is noted that an upper row in each column represents the above current value and a lower row represents an actually stored image with ASCII (American standard code for information interchange) codes.

For example, as the current values corresponding to the route number "02", values of 310 mA, 330 mA, 350 mA, and 370 mA are set for the respective wavelengths $\lambda_1$ through $\lambda_4$. Accordingly, the amplifier controller 13 defines each of the above current values based on the route "02" of the inputted packet as a current value of the amplifier that amplifies an optical signal at a corresponding wavelength. Specifically, the amplifier controller 13 sets "310 mA" as a current value of the amplifier 151 that amplifies an optical signal at the wavelength $\lambda_1$, and sets "330 mA" as a current value of the amplifier 152 that amplifies an optical signal at the wavelength $\lambda_2$. The amplifier controller 13 also sets "350 mA" as a current value of the amplifier 153 that amplifies an optical signal at the wavelength $\lambda_3$, and sets "370 mA" as a current value of the amplifier 154 that amplifies an optical-signal at the wavelength $\lambda_4$.

As described above, the current values of the exciting LDs for the amplifiers 151 through 154 become values different in accordance with a decay rate with the wavelength of the sent optical signal, while the decay rate with the optical signal also differs depending on the route, so that the values different for each route number are set even with a same wavelength. For example, in an example of the wavelength $\lambda_3$, a value of "350 mA" is set for a route of the route number "02", while a value of "380 mA" is set for a route of "03". For routes of the route numbers "04", "05", and "06", respective values of "360 mA", "380 mA", and "349 mA" are set. As just seen, in the tilt correction table 131, the current values of the exciting LDs determined based on the measurement results of the wavelength dependence are set in such a manner that each current value is uniquely decided by specifying the route number and the wavelength of the optical signal.

The optical modulators 141 through 144 have E/O (electrical to optical) converters 141a through 144a and O/E (optical to electrical) converters 141b through 144b, and emit light respectively at wavelengths of $\lambda_1$ through $\lambda_4$ ($\lambda_1 < \lambda_2 < \lambda_3 < \lambda_4$). The E/O converters 141a through 144a, after converting an electrical signal inputted from the packet disassembler 12 in a predetermined modulation procedure into optical signals respectively having different wavelengths, output the optical signals to the amplifiers 151 through 154. Similarly, the O/E converters 141b through 144b, after converting the optical signals inputted respectively from the amplifiers 151 through 154 into electrical signals for each of the different wavelengths in a predetermined modulation procedure, output the electrical signals to the packet assembler 19 described later.

The amplifiers 151 through 154 amplify output levels of the optical signals, inputted respectively from the optical modulators 141 through 144, to the values inputted from the amplifier controller 13 at an amplification factor different for each route and wavelength. The amplifiers 151 through 154 also output the optical signals after amplification to the multiplexer/demultiplexer 16 in a state of offsetting the difference in the output powers between the wavelengths (tilt). The multiplexer/demultiplexer 16 has a multiplexer 161 and a demultiplexer 162. The multiplexer 161 multiplexes the optical signals inputted from the amplifiers 151 through 154 in the WDM procedure and outputs it to the optical switch 17 described later. Meanwhile, the demultiplexer 162, after demultiplexing the optical signal inputted from the optical switch 17 into optical signals having four types of wavelengths $\lambda_1$ through $\lambda_4$, outputs them to the O/E converters 141b through 144b to which the corresponding wavelength is applied. The multiplexer/demultiplexer 16 is achieved by, for example, a digital circuit with a multiplexer function.

The optical switch 17 sets a sending destination and a transmission route of the optical signal multiplexed by the multiplexer 161 in accordance with the destination of the packet. The amplification unit 18 has a post-amplifier 181 and a pre-amplifier 182. The post-amplifier 181 increases the output level of the optical signal inputted from the optical switch 17 at a predetermined amplification factor and sends the amplified optical signal out to the WDM ring network N. The pre-amplifier 182 amplifies the optical signal inputted from the WDM ring network N at a predetermined amplification factor and outputs it to the optical switch 17 described before.

The configuration of the optical transmission device 10 is described above, and since the other optical transmission devices 30 and 40 have configurations similar to the optical transmission device 10, identical reference numerals are used for common components and also detailed descriptions for them are omitted.

Figure 3:
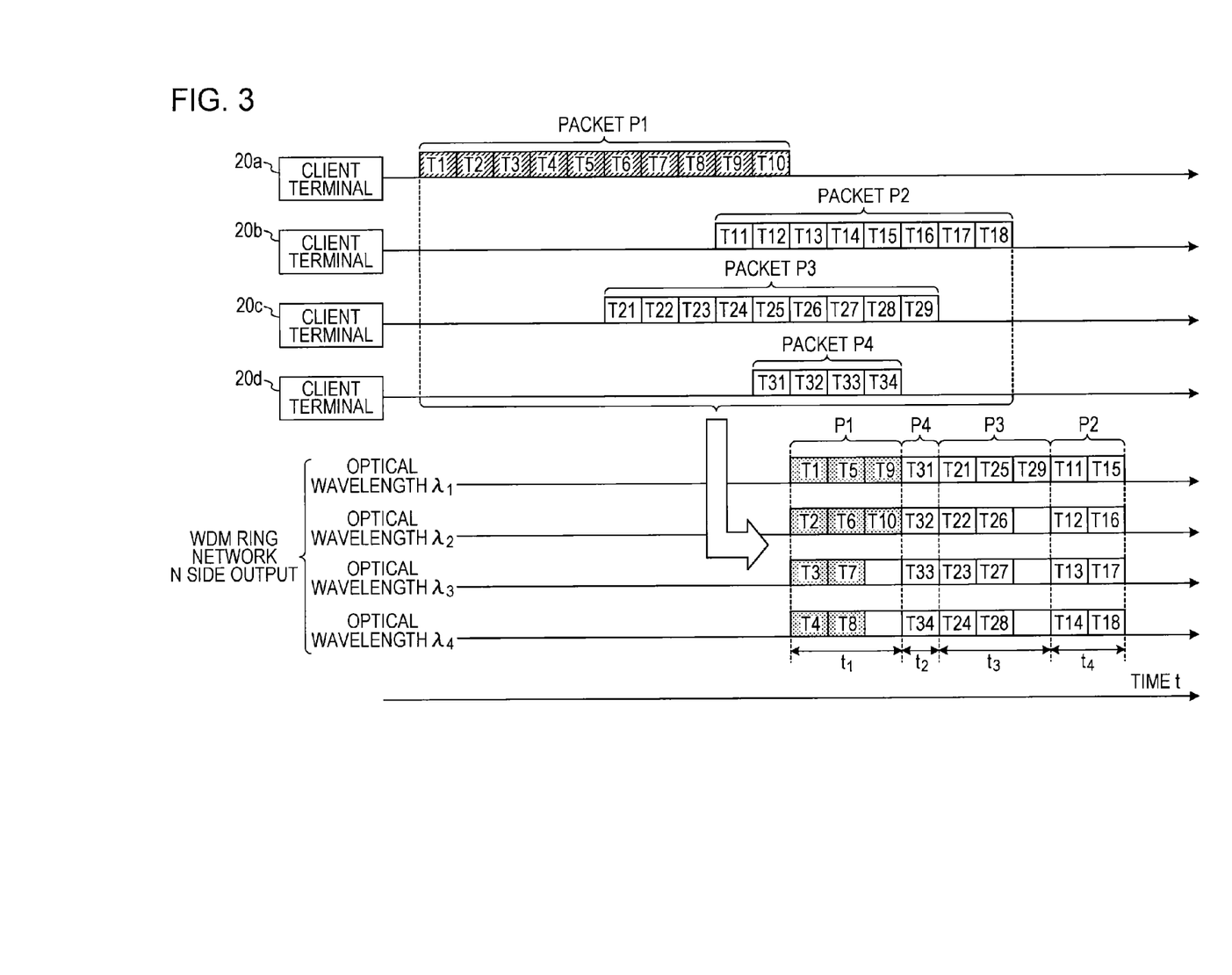
FIG. 3 is a chart illustrating packet processing for the optical transmission device to transmit a packet.

Next, a description is given to behaviors. FIG. 3 is a chart illustrating packet processing for the optical transmission device 10 to transmit a packet. As illustrated in FIG. 3, a packet P1 is configured with ten optical signals T1 through T10. The packet P1 (shaded area in FIG. 3) sent from a client terminal 20a is disassembled into four signal groups (dotted area in FIG. 3) by the packet disassembler 12. After that, these signal groups are outputted to the network side at a corresponding optical wavelength among the plurality of optical wavelengths $\lambda_1$ through $\lambda_4$ by the E/O converter 141a. The four signal groups are, then, integrated again on the receiving side and turn out to be received as one packet. Packets P2 through P4 sent from the client terminals 20b through 20d are similarly disassembled into a plurality of signals respectively, followed by being transmitted at a plurality of optical wavelengths.

Hereinafter, the transmission procedure described above by the optical transmission device 10 is referred to as "optical burst transmission". Not in a case of the optical burst transmission, the optical signals T1 through T10 are sent serially and continuously, which lengthen the time from when inputting the packets to when releasing the lines for the respective wavelengths $\lambda_1$ through $\lambda_4$. As a result, the time of using the network line exclusively by the respective client terminals 20a through 20d sometimes becomes long. In contrast, in the optical burst transmission, as illustrated in FIG. 3, the optical signals T1 through T10 are sent in parallel for each of the respective wavelengths $\lambda_1$ through $\lambda_4$. Transmission time per packet becomes time $t_1$ to complete transmission of at most three signals, for example, the optical signals T1, T5, and T9 in a case of the packet P1. Accordingly, transmission time of the packets P1 through P4 illustrated in FIG. 3 becomes time $t_1$ through $t_4$ and the time to exclusively use the line decreases considerably.

Figure 4:
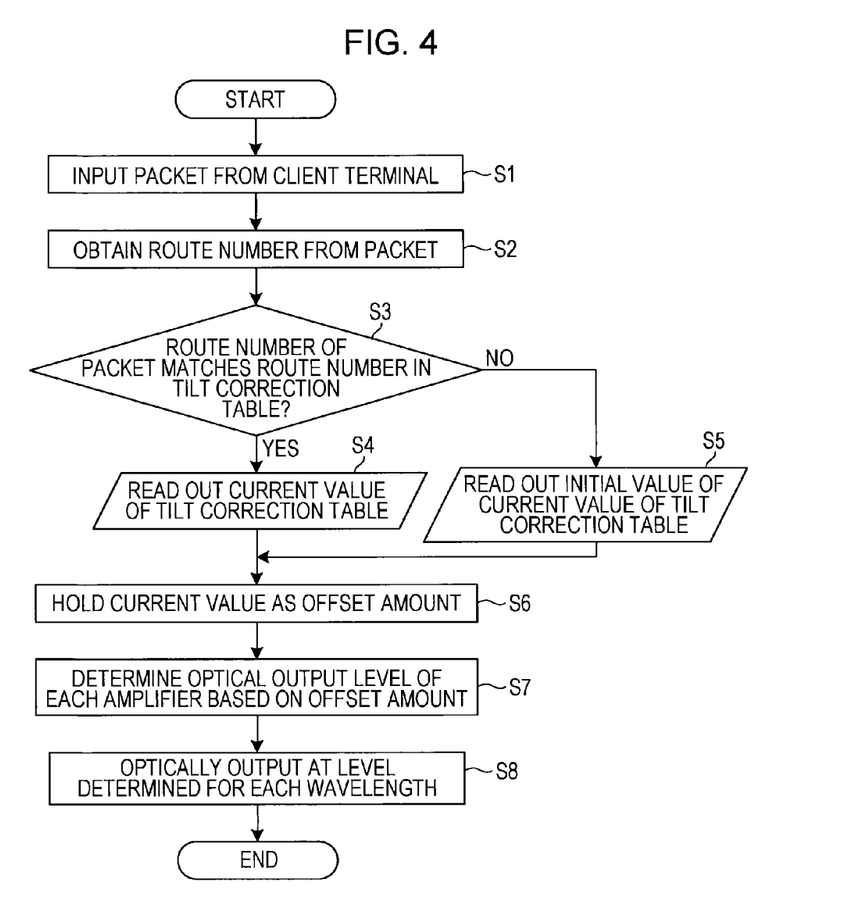
FIG. 4 is a flowchart to illustrate optical output level adjustment processing performed by the optical transmission device.

FIG. 4 is a flowchart to illustrate optical output level adjustment processing performed by the optical transmission device 10. Firstly, as a packet sent from the client terminal 20 is inputted to the optical transmission device 10 (S1), the packet route monitor 11 obtains a route number n (n=00 through 06) of the destination from a header of the packet (S2). The amplifier controller 13 compares and checks the route number n obtained in S2 against route numbers stored in the tilt correction table 131 (S3). As a result, in a case that the above route number n matches the route number stored in the tilt correction table 131 (S3; Yes), the amplifier controller 13 reads out an amplifier exciting LD current value for each of the wavelengths $\lambda_1$ through $\lambda_4$ corresponding to the route number n of the tilt correction table 131 (S4). Meanwhile, in a case that no route number identical to the route number n is stored in the tilt correction table 131 (S3; No), the amplifier controller 13 reads out the value "0" set in the tilt correction table 131 as an initial value of the above current value (S5).

The amplifier controller 13 holds the above current value read out in S4 or S5 as an offset amount (tilt correction amount) (S6). Next, the amplifier controller 13 sets an exciting LD current value for each of the amplifiers 151 through 154 on the basis of the offset amount thus held, thereby deciding the amplification factors of the optical signals at the respective wavelengths $\lambda_1$ through $\lambda_4$, and as a result, the optical output level is determined for each of the amplifiers 151 through 154 (S7). Each of the amplifiers 151 through 154 carries out optical output control at a level determined for each corresponding wavelength (S8).

Figure 5A:
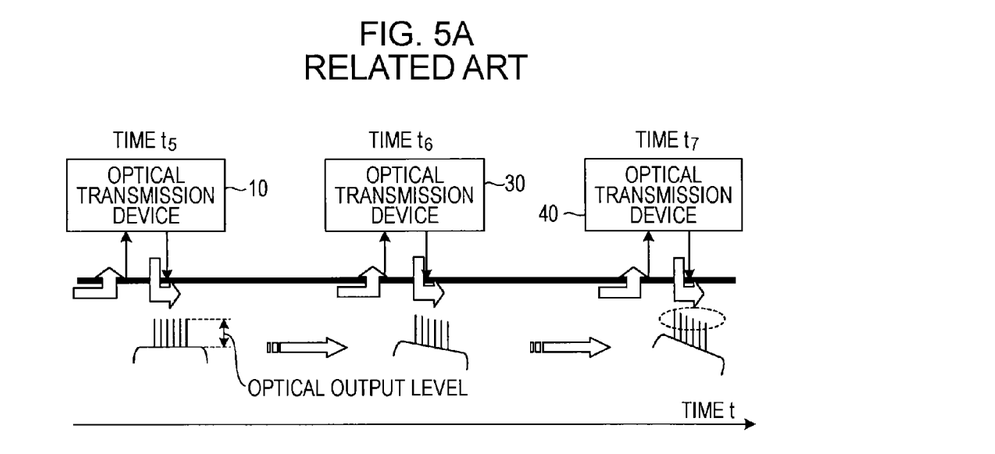
FIG. 5A is a diagram illustrating accumulation of a tilt.

FIG. 5A is a diagram illustrating accumulation of a tilt. As illustrated in FIG. 5A, at time $t_5$, a packet sent from the optical transmission device 10 by the optical burst transmission is in a state that the output level of the optical signal is equal at each wavelength (state of tilt 0). However, at time $t_6$, a tilt occurs due to the influence of a linear amplifier associated with passage through the optical transmission device 30, so that the output level of the optical signal is lowered as going towards a forward direction of the time t. As a result, the output levels of the optical signals having longer wavelengths with a high decay rate (right side) tilt in a downward direction in FIG. 5A. In addition, at time $t_7$, the packet is relayed through the optical transmission device 40, thereby causing the occurrence of accumulation of a tilt and generation of further variations (area surrounded by a broken line in FIG. 5A) in the output level for each wavelength of the optical signal. Accordingly, in order to normally receive the packet on the receiving side, a dynamic range in a range wider than usual (−20 dBm through +4 dBm) is desired.

Figure 5B:
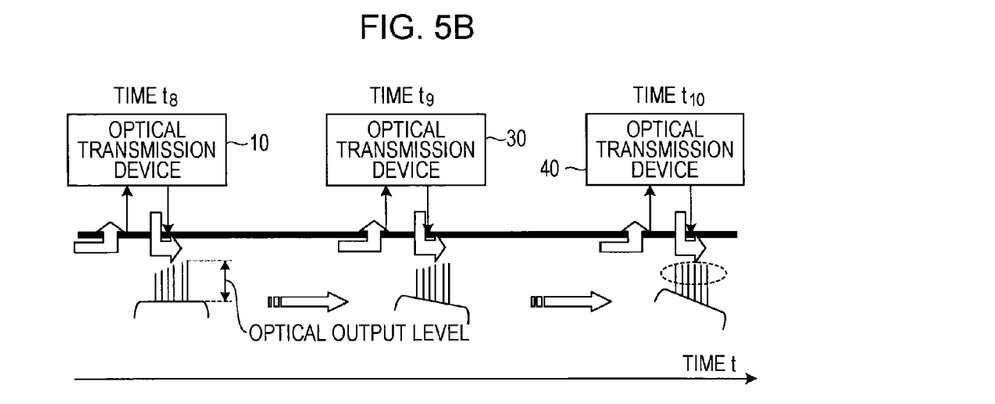
FIG. 5B is a diagram illustrating processing to cancel out a tilt by the optical transmission device according to the present embodiment.

Meanwhile, FIG. 5B is a diagram illustrating processing to cancel out a tilt by the optical transmission device 10. As illustrated in FIG. 5B, at time $t_8$, a packet sent from the optical transmission device 10 by the optical burst transmission is sent at an optical output level taking a tilt amount of each wavelength until reaching the destination into account in advance. Each optical signal configuring the packet having a tilt "0" at time $t_8$ becomes in a state illustrated at time $t_9$ due to the influence of a tilt occurring in association with passage through the optical transmission device 30. At this time, the output level of the optical signal is lowered as going towards a forward direction of time t due to the generation of the tilt, while the tilt amount is added beforehand to this output level, so that the influence of the tilt is limited in comparison with the past. Then, at time $t_{10}$, the packet is relayed through the optical transmission device 40, thereby causing occurrence of the accumulation of a tilt, while the variations (area surrounded by a broken line in FIG. 5B) in the output levels derived from the tilt are cancelled out by the amplification in accordance with the wavelengths of the optical signal. Accordingly, on the receiving side, the output level of each optical signal configuring the packet matches each other approximately, so that the level of each optical wavelength becomes fixed. As a result, the device on the receiving side is enabled to normally receive the packet with a minimally desired dynamic range.

That is, in the WDM system in the past, every time the optical transmission device relays a packet, a tilt due to the linear amplifier accumulates. Therefore, the accumulated tilt amount is added on the receiving side and the level difference of the optical outputs between the wavelengths increases. In contrast, on the sending side, the optical transmission device 10 according to the present embodiment gives a back-calculated value of the tilt amount estimated on the receiving side by offsetting it. Therefore, each time the optical transmission devices 30 and 40 relay a packet, the offset amount is cancelled out and the final optical output levels on the receiving side is equalized.

As just described above, the optical transmission device 10 has the tilt correction table 131, the packet disassembler 12, the amplifiers 151 through 154, and the multiplexer 161. The correction value to be referred to when amplifying an optical signal is set in the tilt correction table 131 as a memory for each optical wavelength. The packet disassembler 12 disassembles data (for example, a packet) into a plurality of optical signals having different wavelengths. It is noted that the packet disassembler 12 may also carry out the disassembly processing as a processor. The amplifiers 151 through 154 as amplification equipment amplify each optical signal of the above data disassembled by the packet disassembler 12 for each of the above optical wavelengths based on the correction value (for example, a current value) set for each optical wavelength so as to uniformize (align) the optical output levels on the receiving side between the respective optical wavelengths. The multiplexer 161 as a multiplex circuit multiplexes the respective optical signals individually amplified by the amplifiers 151 through 154 and sends the above data.

In such a manner, the optical transmission device 10 fixes the optical output levels between the wavelengths when the packet reaches the receiving side. In other words, the optical transmission device 10 gives an offset for each wavelength on the sending side by taking into a consideration of occurrence of a tilt beforehand, thereby cancelling out the variations in the optical output levels after occurrence of a tilt. Accordingly, the variations between wavelengths at the receiving level that occur when the packet is relayed through other optical transmission devices are suppressed and are adjusted in such a manner that all optical wavelengths in the packet fall within a dynamic range of a receiving device. As a result, the optical transmission device 10 is enabled to carry out multi-stage transmission of relays even for optical burst transmission of a packet.

The above correction value is a correction value that is set as a value different for each route of the data, and the amplifiers 151 through 154 may also amplify each optical signal of the above data based on the correction value. Since the decay rate with an optical signal differs from each route, the optical transmission device 10 applies the correction value, which is set as a value different for each route of the packet, to each optical signal, thereby enabling amplification of each optical signal configuring the packet with a transmission distance of the route or a current value appropriate for a number of relays.

It is noted that the setting values stored in the tilt correction table 131 can be updated appropriately as desired. As an opportunity for such update, a case of modifying various parameters, such as a number of devices for a packet sent from the optical transmission device 10 to go through until being received (number of relays) and a transmission distance of the packet, associated with, for example, modification of a network form or the like is relevant. In another situation, a case of seeking further correction (adjustment) by feedback of the correction results because the variations between the wavelengths still remain even after carrying out adjustment of the optical output levels by the optical transmission device 10 is also relevant.

Regarding an update method, since the decay rate with an optical output level usually increases as the route becomes longer, in a case of increasing a route length, the optical transmission device 10 updates the setting values in such a manner that the amplifier exciting LD current value set for each of the wavelengths $\lambda_1$ through $\lambda_4$ to become a higher value (for example, 360 through 450 mA). In addition, as a route becomes longer, usually the number of relays becomes larger and the tilt is accumulated, and thus the difference in the levels between wavelengths increases. Accordingly, in a case of increasing a route length, the optical transmission device 10 updates the setting values in such a manner that the difference in the above current values between the respective wavelengths $\lambda_1$ through $\lambda_4$ becomes a greater value (for example, 60 mA).

Since an optical signal with a longer wavelength has a greater decay rate, as long as the transmission distance is long even when the number of relays is small, for example, the difference in the optical output levels between wavelengths turns out to increase as a result of the difference in the decay rate for each wavelength. Accordingly, it is preferred to carry out an update so as to increase the difference between the amplifier exciting LD current values for a route having a longer transmission distance to the receiving device because of a change in the network form or the like from the perspective of suppressing the variations in the optical output levels. Specifically, the respective values of "310 mA", "330 mA", "350 mA", and "370 mA" are set for each of the wavelengths $\lambda_1$ through $\lambda_4$ as current values corresponding to the route number "02" (refer to FIG. 2). At this time, in a case that the network form is modified from a ring type to a bus type, and associated with that, the route of the route number "02" is made redundant, the amplifier controller 13 updates the current values above to "340 mA", "380 mA", "420 mA", and "460 mA", respectively. When updating, the amplifier controller 13 may also carry out weighting in accordance with the transmission distance and the number of relays by multiplying a predetermined coefficient by one or a plurality of current setting values.

Further, while the optical transmission device 10 is described as to adjust an optical output level for each wavelength based on the transmission route specified from the header of the received packet in the above embodiment, the optical transmission device 10 is not limited to this and may also adjust an optical output level for each wavelength based on the destination of the packet. In such a manner, the optical transmission device 10 can also handle a case that only a destination is recorded in a header portion of the packet or a case that the network configuration is too complex to make it difficult to specify a transmission route. As a result, the flexibility of the WDM system according to the above embodiment is enhanced and the versatility improves.

While the ring type is exemplified as the network form of the WDM system according to the above embodiment, the network form is not limited to this and the present embodiment is applicable to any network form, such as a bus type, a star type, a tree type, or a combination thereof. In addition, the number of the optical transmission devices that relay a packet in the network is also not limited to two but may also be three or more. Further, the transmission distance from the optical transmission device 10 on the packet sending side to the device on the packet receiving side or the distance between the relay devices (device distance) can also employ any value.

Further, in the above embodiment, each component of the optical transmission device 10 does not have to be physically configured as illustration. That is, the specific modes of separation and integration of each device is not limited to illustration and all or a part thereof can also be configured by functionally or physically separating and integrating in any unit in accordance with various loads, states of usage, and the like. For example, the packet disassembler 12 and the packet assembler 19, or the amplifier controller 13 and the tilt correction table 131 may also be integrated into one component, respectively. On the contrary, the amplifier controller 13 may also be separated into a portion of carrying out judgment of identicalness of the route number and a portion of determining the optical output level of each amplifier based on the offset amount. Further, a memory that stores the tilt correction table 131 therein may also be connected through a network or a cable as an external device of the optical transmission device 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission device comprising:
a packet disassembler configured to disassemble a packet into a plurality of optical signals having different wavelengths;
a controller configured to compare a route number of the disassembled packet with stored route numbers in a correction value table;

an amplifier configured to amplify, based on the comparison, the plurality of optical signals having different wavelengths, according to a correction value set according to one of a route number of the disassembled packet and each of the different wavelengths and an initial value to correct wavelength dependence in a WDM network by transmitting the plurality of optical signals in advance at an optical output level to compensate for a tilt amount of each of the different wavelengths at a destination of the plurality of optical signals; and a multiplexer configured to multiplex the amplified plurality of optical signals having different wavelengths and to transmit a packet generated by the multiplexing.

2. The optical transmission device according to claim 1, wherein the correction value is a current value of an exciting laser diode for the amplifier, for tilt correction.

3. An optical transmission method of an optical transmission device, comprising:

disassembling a packet into a plurality of optical signals having different wavelengths;

comparing a route number of the disassembled packet with stored route numbers in a correction value table;

amplifying, based on the comparison, the plurality of optical signals having different wavelengths, according to a correction value set according to one of a route number of the disassembled packet and each of the different wavelengths and an initial value to correct wavelength dependence in a WDM network by transmitting the plurality of optical signals in advance at an optical output level to compensate for a tilt amount of each of the different wavelengths at a destination of the plurality of optical signals;

multiplexing the amplified plurality of optical signals having different wavelengths; and transmitting a packet generated by the multiplexing.

* * * * *